United States Patent Office 2,838,530
Patented June 10, 1958

2,838,530

17-ALKENYL AND 17-ALKYNYL-19-NORTESTOSTERONES

Frank B. Colton, Chicago, Ill., assignor to G. D. Searle & Co., Chicago, Ill., a corporation of Delaware No Drawing. Application October 16, 1957
Serial No. 690,422

Claims priority, application New Zealand
August 19, 1955

8 Claims. (Cl. 260—397.4)

The present invention relates to a new group of highly active hormonal agents and, more particularly, to 17-alkenyl and 17-alkynyl derivatives of 19-nortestosterone of the general structural formula

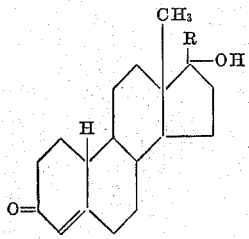

wherein R is a noncyclic unsaturated aliphatic hydrocarbon radical containing 3–6 carbon atoms such as allyl, crotyl, methallyl, ethallyl, hexenyl, methethynyl, propargyl, butynyl, pentynyl, and hexynyl.

The compounds of this invention are highly active hormonal and, particularly, progestational agents. Small doses cause a marked progestational proliferation of the endometrium. This activity can be clearly demonstrated in the tests of McGinty et al. (Endocrinology 24, 829; 1939). The activity was quite unexpected inasmuch as the adjacent lower homologs, in which R represents either a vinyl or an ethynyl radical, are inactive in this test.

The compounds of this invention are useful in medicinal and veterinary practice in the prevention of abortion. They are also useful in the alleviation and control of menstrual disorders.

The compounds which are the subject of this invention are of special utility because they lack side reactions which limit the therapeutic applicability of other progestational agents in many patients. Specifically, the compounds of this invention can be used where anabolic, androgenic and hypotensive side reactions are not desired. This lack of side reactions was also quite unexpected in view of the anabolic and hypotensive activities of the corresponding saturated alkyl derivatives, such as 17-propyl-19-nortestosterone.

The compounds of this invention, in addition to being useful in the pharmaceutical and veterinary fields, are likewise useful as intermediates in organic synthesis. Thus, catalytic hydrogenation converts these alkenyl and alkynyl derivatives to the 17-alkyl-19-nortestosterones, which have a group of valuable hormonal activities, especially as anabolic and hypotensive agents.

The $\Delta^4$-3-ketosteroids of this invention are conveniently prepared by the isomerization of the corresponding $\Delta^5$-3-ketosteroids with a proton transfer agent. These $\Delta^5$-3-ketosteroids can be either of the 3-oxo-5(10)-estren-17-ol type or of the 3-oxo-5(6)-estren-17-ol type.

One of the preferred processes for the manufacture of these compounds comprises the isomerization of a 17-alkenyl or 17-alkynyl derivative of 3-oxo-5(10)-estren-17-ol under the influence of a basic proton transfer agent, such as sodium hydroxide in aqueous methanol, or an acidic proton transfer agent, such as hydrochloric acid or p-toluenesulfonic acid in aqueous methanol, whereby the double bond is caused to migrate from the $\Delta^5$-position to the $\Delta^4$-position. No heating is required in this isomerization procedure. One of the more convenient ways of carrying out this reaction comprises the acid hydrolysis of a 17α-alkenyl (or 17α-alkynyl) derivatives of a 3-alkoxy-2,5(10)-estradien-17-ol; in this case it is possible to cause cleavage of the enol ether function at position 3, ketonization of the resulting 3-enol to the 17-alkenyl (or 17-alkynyl) derivative of 3-oxo-5(10)-estren-17-ol, and rearrangement of the double bond into conjugation with the 3-ketone in a single reaction vessel without the necessity of isolating any of the intermediates formed. It will be apparent that the direct conversion of a 17-alkenyl (or 17-alkynyl) derivative of a 3-alkoxy-2,5(10)-estradien-17-ol to the 17-alkenyl or 17-alkynyl derivative of 19-nortestosterone is equivalent to the isomerization of a 17-alkenyl (or 17-alkynyl) derivative of 3-oxo-5(10)-estren-17-ol to the 19-nortestosterone derivative, and that these are alternative modifications of a single process, involving an optional selection of operating details.

Another useful method for carrying out the isomerization comprises the use of the 17 - alkenyl (or 17 - alkynyl) derivative of 3 - oxo-5(6)-estren-17-ol. This 5(6)-estren-17-ol derivative is formed in an Oppenauer type of oxidation process. In such a process, the 17-alkenyl (or 17-alkynyl) derivative of 5(6)-estren-3,17-diol is oxidized under Oppenauer condition, typically by using an aluminum tertiary alcoholate and a hydrogen acceptor such as an alkanone. In this Oppenauer oxidation one forms first the aluminum derivative of the secondary alcohol in the 3-position. This aluminum derivative is then transformed to the 17-alkenyl (or 17-alkynyl) derivative of 3-oxo-5(6)-estren-17-ol. It is more practical not to isolate this compound, however, but to let the proton transfer agents in the reaction mixture, typically the aluminum oxide, cause the isomerization to the 3-oxo-4-estren-17-ol.

The present invention is a continuation-in-part of my copending application Serial No. 604,337, filed August 16, 1956, now abandoned.

EXAMPLE 1

A trace amount of iodine is added to a mixture of 1.7 parts of magnesium and 18 parts of ether. All of the ether is removed by distillation, and the magnesium is covered with a fresh portion of 70 parts of ether. A solution of 9 parts of allyl bromide in 70 parts of ether is slowly added to the stirred reaction mixture, after which there is gradually added a solution of 2 parts of 3-methoxy-2,5(10)-estradien-17-one in 70 parts of ether. The reaction mixture is heated under reflux for an additional hour, and then a solution of 10 parts of sodium potassium tartrate in 100 parts of water is cautiously added with efficient stirring. The ethereal layer is separated, washed with water, dried over sodium sulfate and filtered. The residue obtained by concentration of the filtrate is recrystallized from a mixture of ether and methanol, yielding a product melting at about 88–96° C. which is predominantly 17α - allyl - 3-methoxy-2,5(10)-estradien-17-ol. A mixture of 1.5 parts of this product, 32 parts of methanol, 5 parts of water and 1.8 parts of concentrated hydrochloric acid is either heated under reflux for 5 minutes or allowed to stand at room temperature for two hours. The product precipitated on dilution of the reaction mixture with water is purified by chromatographic fractionation over 150 parts of silica gel. The column is developed with benzene solutions containing increasing concentrations of ethyl acetate. Crystallization from acetone-petroleum ether of the material which is eluted with 25% ethyl acetate in benzene yields 17-allyl-19-nortestosterone melting at about 93–95° C. The ultraviolet absorption spectrum shows a maximum at about 240 millimicrons with a molecular extinction coefficient of about 17,000. The infrared spectrum, determined with the use of a potassium bromide disk, shows bands at 2.91, 6.03, 6.9, 7.02, 7.25, 7.32, 7.49, 7.87, 8.22, 9.51, 10.12, 10.31 and 10.97 microns.

EXAMPLE 2

To 1.7 parts of magnesium turnings, covered with 100 parts of ether are added 12.5 parts of crotyl bromide in 40 parts of ether. The reaction can be advantageously initiated by the addition of a trace of iodine. Then 2 parts of 3-methoxy-2,5(10)-estradien-17-one in 70 parts of ether are added and the reaction mixture is refluxed for 90 minutes. After this time 100 parts of a 10% Rochelle salt solution is slowly added. The ether layer is separated, washed with water and twice with saturated sodium chloride solution, dried over anhydrous sodium sulfate, filtered and evaporated under vacuum. The residue is dissolved in methanol and then treated with 1.5 parts of concentrated hydrochloric acid and 5 parts of water. About 90 minutes are allowed for the cleavage and isomerization to be completed. The product is precipitated by addition of cold water and purified by chromatographing over 200 parts of silica gel. The column is developed with benzene solutions containing increasing concentrations of ethyl acetate. A 10% solution of ethyl acetate in benzene elutes the 17-(1-buten-3-yl)-19-nortestosterone which after successive crystallizations from ether and petroleum ether, then from acetone and water, and finally from ethyl acetate and petroleum ether melts at about 160–162° C. The ultraviolet absorption spectrum shows a maximum at about 240 millimicrons with a molecular extinction coefficient of about 17,000. Infrared maxima observed at about 2.84, 6.05, 6.20, 6.92, 7.43, 7.92, 8.23, 8.58 and 9.0 microns.

EXAMPLE 3

To a stirred mixture of 3.4 parts of magnesium turnings in 150 parts of ether there are added 25 parts of methallyl bromide in 100 parts of ether. Then 4 parts of 3-methoxy-2,5(10)-estradien-17-one in 150 parts of ether are added and the reaction mixture is refluxed for 3 hours. A solution of 20 parts of sodium potassium tartrate in 200 parts of water is then cautiously added with efficient stirring. The ether layer is separated, washed with water, dried over sodium sulfate and filtered. The residue obtained by concentration of the filtrate is recrystallized from a mixture of ether and methanol to yield a product which is predominantly 17α-methallyl-3-methoxy-2,5(10)-estradien-17-ol. A mixture of 3 parts of this product, 64 parts of methanol, 10 parts of water, and 3.6 parts of concentrated hydrochloric acid is heated under reflux for 5 minutes. The reaction can also be carried out by leaving the reaction mixture at room temperature for 90 minutes. The gummy product obtained by dilution of the reaction mixture with water is washed repeatedly by decantation with water and dried. Purification is achieved by crystallization from a mixture of acetone and petroleum ether or by chromatographic fractionation on silica gel. In this manner there is obtained 17-methylallyl-19-nortestosterone. The ultra-violet absorption spectrum of this compound shows a maximum at about 240 millimicrons with a molecular extinction coefficient of 17,200. Infrared maxima are observed at 2.8, 6.0 and 6.2 microns. The melting point is about 105–106° C.

EXAMPLE 4

Substitution of an equivalent amount of 6-iodo-1-hexene for the methallyl bromide used in the preceding example yields the 17α-hexenyl-19-nortestosterone. The infrared absorption spectrum of this compound shows maxima at 2.8, 6.0 and 6.2 microns.

EXAMPLE 5

A mixture of 57 parts of 3-methoxy-2,5(10)-estradien-17-one in 3000 parts of liquid ammonia and 20 parts of sodamide is saturated with dry propyne. A slow stream of propyne is passed through the reaction mixture with stirring for four hours. After this time the mixture is treated by slow addition with 50 parts of powdered ammonium chloride solution and permitted to stand at 25° C. until most of the ammonia is evaporated. The reaction mixture is then treated with water and ether and the ether layer is separated, washed with water, dried over sodium sulfate, filtered and solvent stripped under vacuum. The resulting 17α-methylethynyl-3-methoxy-2,5(10)-estradien-17-ol is crystallized from a mixture of ether and methanol. A mixture of 45 parts of this product, 100 parts of methanol, 15 parts of water and 5 parts of concentrated hydrochloric acid is maintained at room temperature for two hours. A sufficient amount of water is then added to cause turbidity. Upon standing 17-methylethynyl-19-nortestosterone precipitates which is crystallized from acetone and petroleum ether. Recrystallized from a mixture of acetone and petroleum ether it melts at about 157–159° C. The ultraviolet absorption spectrum shows a maximum at 240 millicrons with a molecular extinction coefficient of about 17,100. Infrared maxima are observed at 3.0, 6.01, 6.19, 6.91, 7.50, 7.72, 8.82, 9.34, 9.49, 10.32 and 11.30 microns. The compound has the structural formula

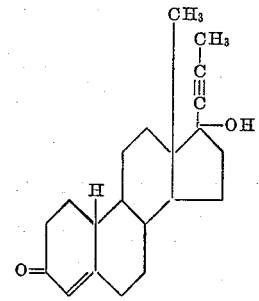

EXAMPLE 6

A stirred mixture of 5.7 parts of 3-methoxy-2,5(10)-estradien-17-one in 300 parts of liquid ammonia and 2 parts of sodamide is treated with 5 parts 1-hexyne. Stirring is continued for four hours and then the mixture is treated with 6 parts of powdered aluminum chloride. After standing at about 25° C. until most of the ammonia has escaped, ether and water are added. The ether layer is separated, washed with water, dried over sodium sulfate, filtered and concentrated under vacuum. The residue is crystallized from a mixture of ether and methanol. A mixture of 5 parts of the 17α-(1'-hexynyl)-3-methoxy-2,5(10)-estradien-17-ol thus obtained, 100 parts of methanol, 15 parts of water and 5 parts of concentrated hydrochloric acid is maintained at room temperature for 100 minutes and then treated with a sufficient amount of water to cause turbidity. On chilling the 17-(1-hexynyl)-19-nortestosterone precipitates which is recrystallized repeatedly from a mixture of acetone and ether. The ultraviolet absorption spectrum of this compound shows a maximum at about 240 millimicrons with a molecular extinction coefficient of about 17,300. Infrared maxima observed 2.9, 6.0, and 6.2 microns. The compound has the structural formula

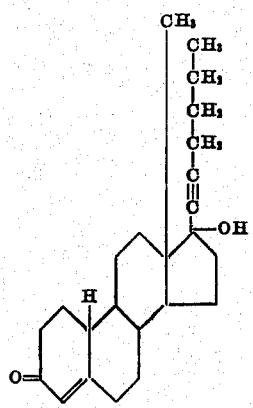

EXAMPLE 7

To a solution of 6 parts of allyl magnesium bromide in 50 parts of ether is added slowly a solution of 1 part of 3-hydroxy-5(6)-estren-17-one(norandrostenolone) in 50 parts of ether. The mixture is refluxed for 90 minutes, cooled and decomposed by stirring with a 10% aqueous solution of sodium potassium tartrate. The ether layer is separated, washed with water, dried over sodium sulfate, filtered and evaporated to yield the crude 17α-allyl-5(6)-estrene-3,17-diol.

To an anhydrous mixture of this compound, 30 parts of toluene and 20 parts of cyclohexanone are added 2.5 parts of aluminum isopropoxide in 10 parts of toluene. The resulting mixture is refluxed for 20 minutes and then poured into 100 parts of a saturated aqueous solution of sodium potassium tartrate. After removal of the organic solvents by steam distillation, the residue is collected and subjected to chromatography over silica gel. Purification by the method of Example 1 yields 17-allyl-19-nortestosterone melting at about 93–95° C.

What is claimed is:

1. A compound of the structural formula

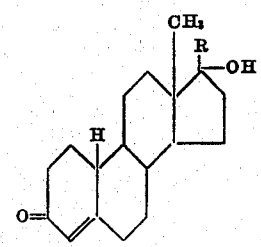

wherein R is a noncyclic unsaturated aliphatic hydrocarbon radical containing 3–6 carbon atoms.

2. 17-alkenyl-19-nortestosterone wherein the alkenyl radical contains 3–6 carbon atoms.

3. 17-allyl-19-nortestosterone.

4. 17-butenyl-19-nortestosterone.

5. 17-alkynyl-19-nortestosterone wherein the alkynyl radical contains 3–6 carbon atoms.

6. 17-methylethynyl-19-nortestosterone.

7. 17-(1-buten-3-yl)-19-nortestosterone.

8. 17-methallyl-19-nortestosterone.

No references cited.